(12) United States Patent
Chamberlin et al.

(10) Patent No.: US 9,048,710 B2
(45) Date of Patent: Jun. 2, 2015

(54) ELECTRIC MACHINE MODULE COOLING SYSTEM AND METHOD

(75) Inventors: Bradley D. Chamberlin, Pendleton, IN (US); James J. Ramey, Fortville, IN (US); Alex S. Creviston, Muncie, IN (US)

(73) Assignee: Remy Technologies, LLC, Pendleton, IN (US)

( * ) Notice: Subject to any disclaimer, the term of this patent is extended or adjusted under 35 U.S.C. 154(b) by 896 days.

(21) Appl. No.: 13/220,428

(22) Filed: Aug. 29, 2011

(65) Prior Publication Data

US 2013/0049496 A1  Feb. 28, 2013

(51) Int. Cl.
H02K 9/00 (2006.01)
H02K 3/24 (2006.01)
H02K 5/20 (2006.01)

(52) U.S. Cl.
CPC ... *H02K 3/24* (2013.01); *H02K 5/20* (2013.01)

(58) Field of Classification Search
CPC .............. H02K 9/19; H02K 5/20; H02K 3/24
USPC ............................ 310/400, 54, 53, 58, 59, 89
See application file for complete search history.

(56) References Cited

U.S. PATENT DOCUMENTS

| | | | |
|---|---|---|---|
| 2,080,678 A | 5/1937 | Van Horn et al. |
| 2,264,616 A | 12/1941 | Buckbee |
| 3,155,856 A | 11/1964 | Macha et al. |
| 3,447,002 A | 5/1969 | Ronnevig |
| 3,525,001 A | 8/1970 | Erickson |
| 3,748,507 A | 7/1973 | Sieber |
| 4,038,570 A | 7/1977 | Durley, III |
| 4,710,662 A | 12/1987 | Balker et al. |
| 5,081,382 A | 1/1992 | Collings et al. |
| 5,180,004 A | 1/1993 | Nguyen |
| 5,207,121 A | 5/1993 | Blen |
| 5,293,089 A | 3/1994 | Frister |
| 5,372,213 A | 12/1994 | Hasebe et al. |
| 5,519,269 A | 5/1996 | Lindberg |

(Continued)

FOREIGN PATENT DOCUMENTS

JP 05-103445 A 4/1993
JP 05-292704 A 11/1993

(Continued)

OTHER PUBLICATIONS

Jp 2004215353 A machine translation, Jun. 2, 2014.*

(Continued)

*Primary Examiner* — Dang Le
*Assistant Examiner* — Leda Pham
(74) *Attorney, Agent, or Firm* — Greenberg Traurig, LLP (57) ABSTRACT

Embodiments of the invention provide an electric machine module. The module can include a housing, which can define a machine cavity. In some embodiments, an electric machine can be positioned within the machine cavity. In some embodiments, the electric machine can include a stator assembly including potted stator end turns. An end turn member can be positioned within the machine cavity and can include a radially inward flange and a radially outward flange axially extending from a central region. The end turn member is configured and arranged so that the flanges are substantially adjacent the stator end turns. The end turn member can include at least one second member aperture disposed through a portion of the central region.

16 Claims, 5 Drawing Sheets

(56) References Cited

U.S. PATENT DOCUMENTS

| | | | |
|---|---|---|---|
| 5,616,973 A | 4/1997 | Khazanov | |
| 5,859,482 A | 1/1999 | Crowell et al. | |
| 5,923,108 A | 7/1999 | Matake et al. | |
| 5,937,817 A | 8/1999 | Schanz et al. | |
| 5,965,965 A | 10/1999 | Umeda et al. | |
| 6,011,332 A | 1/2000 | Umeda et al. | |
| 6,069,424 A | 5/2000 | Colello et al. | |
| 6,075,304 A | 6/2000 | Nakatsuka | |
| 6,087,746 A | 7/2000 | Couvert | |
| 6,095,754 A | 8/2000 | Ono | |
| 6,097,130 A | 8/2000 | Umeda et al. | |
| 6,114,784 A | 9/2000 | Nakano | |
| 6,147,430 A | 11/2000 | Kusase et al. | |
| 6,147,432 A | 11/2000 | Kusase et al. | |
| 6,173,758 B1 | 1/2001 | Ward et al. | |
| 6,181,043 B1 | 1/2001 | Kusase et al. | |
| 6,201,321 B1 | 3/2001 | Mosciatti | |
| 6,208,060 B1 | 3/2001 | Kusase et al. | |
| 6,232,687 B1 | 5/2001 | Hollenbeck et al. | |
| 6,242,836 B1 | 6/2001 | Ishida et al. | |
| 6,278,206 B1 | 8/2001 | Yockey et al. | |
| 6,291,918 B1 | 9/2001 | Umeda et al. | |
| 6,300,693 B1 | 10/2001 | Poag et al. | |
| 6,313,559 B1 | 11/2001 | Kusase et al. | |
| 6,333,537 B1 | 12/2001 | Nakamura | |
| 6,335,583 B1 | 1/2002 | Kusase et al. | |
| 6,346,758 B1 | 2/2002 | Nakamura | |
| 6,359,232 B1 | 3/2002 | Markovitz et al. | |
| 6,404,628 B1 | 6/2002 | Nagashima et al. | |
| 6,417,592 B2 | 7/2002 | Nakamura et al. | |
| 6,445,095 B1 | 9/2002 | Liang et al. | |
| 6,459,177 B1 | 10/2002 | Nakamura et al. | |
| 6,509,665 B1 | 1/2003 | Nishiyama et al. | |
| 6,515,392 B2 | 2/2003 | Ooiwa | |
| 6,522,043 B2 | 2/2003 | Measegi | |
| 6,559,572 B2 | 5/2003 | Nakamura | |
| 6,579,202 B2 | 6/2003 | El-Antably et al. | |
| 6,744,158 B2 | 6/2004 | Liang et al. | |
| 6,770,999 B2 | 8/2004 | Sakuraki | |
| 6,897,594 B2 | 5/2005 | Ichikawa et al. | |
| 6,903,471 B2 | 6/2005 | Arimitsu et al. | |
| 6,998,749 B2 | 2/2006 | Wada et al. | |
| 7,002,267 B2 | 2/2006 | Raszkowski et al. | |
| 7,026,733 B2 | 4/2006 | Bitsche et al. | |
| 7,239,055 B2 | 7/2007 | Burgman et al. | |
| 7,276,006 B2 | 10/2007 | Reed et al. | |
| 7,284,313 B2 | 10/2007 | Raszkowski et al. | |
| 7,339,300 B2 | 3/2008 | Burgman et al. | |
| 7,352,091 B2 | 4/2008 | Bradfield | |
| 7,402,923 B2 | 7/2008 | Klemen et al. | |
| 7,417,344 B2 | 8/2008 | Bradfield | |
| 7,508,100 B2 | 3/2009 | Foster | |
| 7,538,457 B2 | 5/2009 | Holmes et al. | |
| 7,545,060 B2 | 6/2009 | Ward | |
| 7,592,045 B2 | 9/2009 | Smith et al. | |
| 7,615,903 B2 | 11/2009 | Holmes et al. | |
| 7,615,951 B2 | 11/2009 | Son et al. | |
| 7,667,359 B2 | 2/2010 | Lee et al. | |
| 7,939,975 B2 | 5/2011 | Saga et al. | |
| 8,067,865 B2 | 11/2011 | Savant | |
| 8,068,327 B2 | 11/2011 | Seifert et al. | |
| 8,552,600 B2 | 10/2013 | Bradfield | |
| 2002/0074889 A1* | 6/2002 | Kikuchi et al. | 310/214 |
| 2002/0180284 A1 | 12/2002 | Leflem et al. | |
| 2003/0222519 A1 | 12/2003 | Bostwick | |
| 2004/0036367 A1 | 2/2004 | Denton et al. | |
| 2004/0189110 A1 | 9/2004 | Ide | |
| 2004/0195929 A1 | 10/2004 | Oshidari | |
| 2005/0023266 A1 | 2/2005 | Ueno et al. | |
| 2005/0023909 A1 | 2/2005 | Cromas | |
| 2005/0194551 A1 | 9/2005 | Klaussner et al. | |
| 2005/0274450 A1 | 12/2005 | Smith et al. | |
| 2005/0285456 A1 | 12/2005 | Amagi et al. | |
| 2007/0024130 A1 | 2/2007 | Schmidt | |
| 2007/0052313 A1 | 3/2007 | Takahashi | |
| 2007/0063607 A1 | 3/2007 | Hattori | |
| 2007/0145836 A1 | 6/2007 | Bostwick | |
| 2007/0149073 A1 | 6/2007 | Klaussner et al. | |
| 2007/0216236 A1 | 9/2007 | Ward | |
| 2008/0223557 A1* | 9/2008 | Fulton et al. | 165/104.33 |
| 2008/0278011 A1 | 11/2008 | Elgas et al. | |
| 2009/0121562 A1 | 5/2009 | Yim | |
| 2009/0174278 A1 | 7/2009 | Sheaffer et al. | |
| 2009/0206687 A1 | 8/2009 | Woody et al. | |
| 2009/0267426 A1 | 10/2009 | Graner et al. | |
| 2010/0026111 A1 | 2/2010 | Monzel | |
| 2010/0045125 A1* | 2/2010 | Takenaka et al. | 310/54 |
| 2010/0102649 A1 | 4/2010 | Cherney et al. | |
| 2010/0109454 A1 | 5/2010 | Vadillo et al. | |
| 2010/0176668 A1 | 7/2010 | Murakami | |
| 2010/0320851 A1 | 12/2010 | Lambka et al. | |
| 2011/0050141 A1 | 3/2011 | Yeh et al. | |
| 2011/0101700 A1 | 5/2011 | Stiesdal | |
| 2011/0109095 A1 | 5/2011 | Stiesdal | |

FOREIGN PATENT DOCUMENTS

| | | | | |
|---|---|---|---|---|
| JP | 06-036364 U | 5/1994 | | |
| JP | 06-311691 A | 11/1994 | | |
| JP | 07-264810 A | 10/1995 | | |
| JP | 08-019218 A | 1/1996 | | |
| JP | 09-046973 A | 2/1997 | | |
| JP | 09-154257 A | 6/1997 | | |
| JP | 10-234157 A | 9/1998 | | |
| JP | 11-132867 A | 5/1999 | | |
| JP | 11-206063 A | 7/1999 | | |
| JP | 2000-152563 A | 5/2000 | | |
| JP | 2000-324757 A | 11/2000 | | |
| JP | 2000-333409 A | 11/2000 | | |
| JP | 2001-333559 A | 11/2001 | | |
| JP | 2002-095217 A | 3/2002 | | |
| JP | 2002-119019 A | 4/2002 | | |
| JP | 2003-250247 A | 9/2003 | | |
| JP | 2003-299317 A | 10/2003 | | |
| JP | 2003-324901 A | 11/2003 | | |
| JP | 2004-215353 A | 7/2004 | | |
| JP | 2004215353 A | * 7/2004 | | H02K 9/22 |
| JP | 2004-236376 A | 8/2004 | | |
| JP | 2004-248402 A | 9/2004 | | |
| JP | 2004-297924 A | 10/2004 | | |
| JP | 2004-312886 A | 11/2004 | | |
| JP | 2004-357472 A | 12/2004 | | |
| JP | 2005-012989 A | 1/2005 | | |
| JP | 2005-057957 A | 3/2005 | | |
| JP | 2005-168265 A | 6/2005 | | |
| JP | 2006-060914 A | 3/2006 | | |
| JP | 2000-152561 A | 9/2006 | | |
| JP | 2006-297541 A | 11/2006 | | |
| JP | 2006-528879 A | 12/2006 | | |
| JP | 2007-282341 A | 10/2007 | | |
| JP | 2008-021950 A | 2/2008 | | |
| JP | 2008-206213 A | 9/2008 | | |
| JP | 2008-219960 A | 9/2008 | | |
| JP | 4187606 B2 | 11/2008 | | |
| JP | 2008-544733 A | 12/2008 | | |
| JP | 2009-247084 A | 10/2009 | | |
| JP | 2009-247085 A | 10/2009 | | |
| JP | 2009-254205 A | 10/2009 | | |
| JP | 2010-028908 A | 2/2010 | | |
| JP | 2010-028958 A | 2/2010 | | |
| JP | 2010-035265 A | 2/2010 | | |
| JP | 2010-063253 A | 3/2010 | | |
| JP | 2010-121701 A | 6/2010 | | |
| JP | 2010-246268 A | 10/2010 | | |
| KR | 10-1997-0055103 A | 7/1997 | | |
| KR | 10-2000-0013908 A | 3/2000 | | |
| KR | 10-2006-0102496 A | 9/2006 | | |
| KR | 10-2007-0027809 A | 3/2007 | | |
| KR | 10-2009-0048028 A | 5/2009 | | |

OTHER PUBLICATIONS

International Search Report, Received Jul. 31, 2012.
KIPO Search Report and Written Opinion dated Jan. 21, 2013 for

(56) References Cited

OTHER PUBLICATIONS corresponding Application No. PCT/US2012/052614.
International Search Report, Received Jan. 9, 2012.
International Search Report, Received Feb. 16, 2012.
International Search Report, Received Dec. 22, 2011.
International Search Report, Received Dec. 5, 2011.
International Search Report, Received Dec. 27, 2011.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.
WIPO Search Report and Written Opinion dated Oct. 29, 2012 for corresponding Application No. PCT/US2012/033915; 8 sheets.
WIPO Search Report and Written Opinion dated Nov. 14, 2012 for corresponding Application No. PCT/US2012/040794; 8 sheets.

* cited by examiner

ELECTRIC MACHINE MODULE COOLING SYSTEM AND METHOD

BACKGROUND

Electric machines, often contained within a machine cavity of a housing, generally include a stator and a rotor. For some electric machines, the stator can be secured to the housing using different coupling techniques to generally secure the electric machine within the housing. During operation of electric machines, a considerable amount of heat energy can by generated by both the stator and the rotor, as well as other components of the electric machine. For some electric machines, the increase in heat energy can, at least partially, interfere with the coupling of the housing to the stator.

SUMMARY

Some embodiments of the invention provide an electric machine module. The module can include a housing, which can define a machine cavity. In some embodiments, an electric machine can be positioned within the machine cavity. In some embodiments, the electric machine can include a stator assembly, which can include stator end turns. In some embodiments, an end turn member can be positioned within the machine cavity and can include a radially inward flange and a radially outward flange axially extending from a central region. In some embodiments, the end turn member can be configured and arranged so that the flanges can be substantially adjacent to at least a portion of the stator end turns. In some embodiments, the end turn member can include at least one second member aperture disposed through a portion of the central region.

Some embodiments of the invention provide an electric machine module including a housing. In some embodiments, the housing can at least partially define a machine cavity and can include a coolant jacket and at least one coolant aperture disposed through a portion of the housing. In some embodiments, an end turn member can be positioned within the machine cavity so that at least a portion of the end turn member can contact the housing. In some embodiments, the end turn member can include a radially inward flange and a radially outward flange axially extending from a central region. In some embodiments, at least one first member aperture can be disposed through a portion of the radially outward flange. In some embodiments, the end turn member can positioned in the machine cavity so that the first member aperture can be substantially immediately adjacent to and in fluid communication with the coolant aperture.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 1:
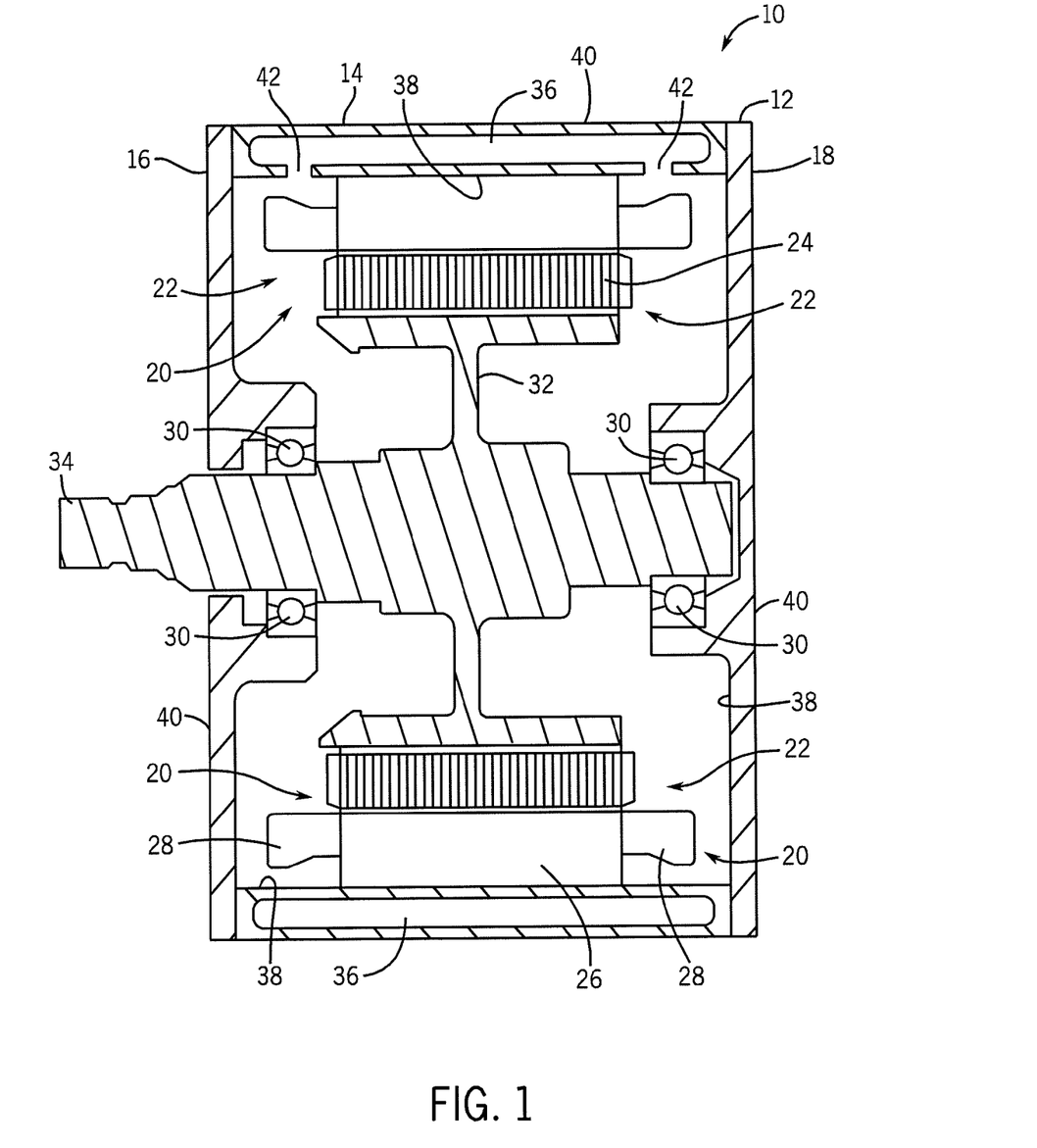
FIG. 1 is a cross-sectional view of an electric machine module according to one embodiment of the invention.

FIG. 1 illustrates an electric machine module 10 according to one embodiment of the invention. The module 10 can include a housing 12 comprising a sleeve member 14, a first end cap 16, and a second end cap 18. An electric machine 20 can be housed within a machine cavity 22 at least partially defined by the sleeve member 14 and the end caps 16, 18. For example, the sleeve member 14 and the end caps 16, 18 can be coupled via conventional fasteners (not shown), or another suitable coupling method, to enclose at least a portion of the electric machine 20 within the machine cavity 22. In some embodiments the housing 12 can comprise a substantially cylindrical canister and a single end cap (not shown). Further, in some embodiments, the module housing 12, including the sleeve member 14 and the end caps 16, 18, can comprise materials that can generally include favorable thermally conductive properties, such as, but not limited to aluminum or other metals and materials capable of generally withstanding operating temperatures of the electric machine. In some embodiments, the housing 12 can be fabricated using different methods including casting, molding, extruding, and other similar manufacturing methods.

The electric machine 20 can include a rotor assembly 24, a stator assembly 26, including stator end turns 28, and bearings 30, and can be disposed about a shaft 34. As shown in FIG. 1, the stator assembly 26 can substantially circumscribe at least a portion of the rotor assembly 24. In some embodiments, the rotor assembly 24 can also include a rotor hub 32 or can have a "hub-less" design (not shown).

In some embodiments, the electric machine 20 can be operatively coupled to the module housing 12. For example, the electric machine 20 can be fit within the housing 12. In some embodiments, the electric machine 20 can be fit within the housing 12 using an interference fit, a shrink fit, other similar friction-based fit that can at least partially operatively couple the machine 20 and the housing 12. For example, in some embodiments, the stator assembly 26 can be shrunk fit into the module housing 12. Further, in some embodiments, the fit can at least partially secure the stator assembly 26, and as a result, the electric machine 20, in both axial and circumferential directions. In some embodiments, during operation of the electric machine 20 the fit between the stator assembly 26 and the module housing 12 can at least partially serve to transfer torque from the stator assembly 26 to the module housing 12. In some embodiments, the fit can result in a generally greater amount of torque retained by the module 10.

The electric machine 20 can be, without limitation, an electric motor, such as a hybrid electric motor, an electric generator, or a vehicle alternator. In one embodiment, the electric machine 20 can be a High Voltage Hairpin (HVH) electric motor or an interior permanent magnet electric motor for hybrid vehicle applications.

Components of the electric machine 20 such as, but not limited to, the rotor assembly 24, the stator assembly 26, and the stator end turns 28 can generate heat during operation of the electric machine 20. These components can be cooled to increase the performance and the lifespan of the electric machine 20.

Figure 2:
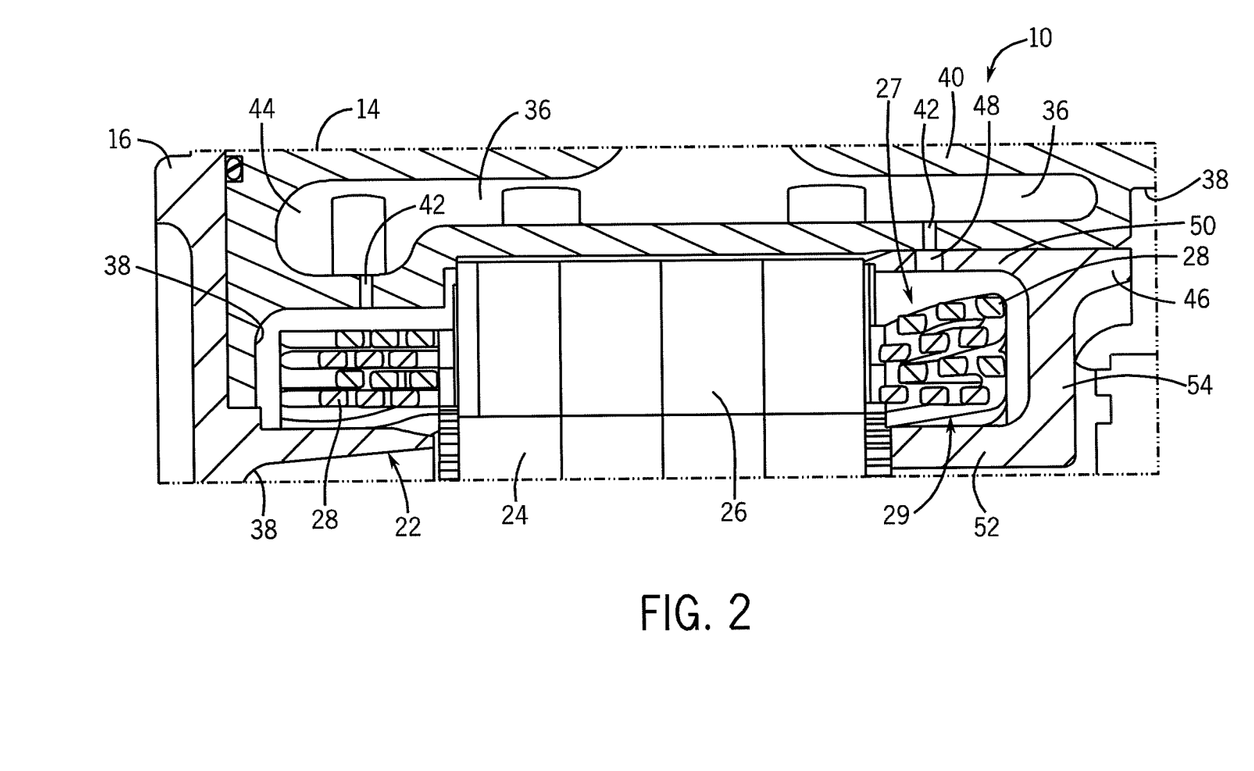
FIG. 2 is a partial cross-sectional view of portions of an electric machine module according to one embodiment of the invention

As shown in FIGS. 1 and 2, in some embodiments, the housing 12 can comprise a coolant jacket 36. In some embodiments, the housing 12 can include an inner wall 38 and an outer wall 40 and the coolant jacket 36 can be positioned substantially between at least a portion the walls 38, 40. For example, in some embodiments, the machine cavity 22 can be at least partially defined by the inner wall 38 (e.g., each of the elements of the housing 12 can comprise a portion of the inner wall 38). In some embodiments, the coolant jacket 36 can substantially circumscribe at least a portion of the electric machine 20. More specifically, in some embodiments, the coolant jacket 36 can substantially circumscribe at least a portion of an outer perimeter of the stator assembly 26, including the stator end turns 28.

Further, in some embodiments, the coolant jacket 36 can contain a coolant that can comprise transmission fluid, ethylene glycol, an ethylene glycol/water mixture, water, oil, motor oil, a gas, a mist, or a similar substance. The coolant jacket 36 can be in fluid communication with a coolant source (not shown) which can pressurize the coolant prior to or as it is being dispersed into the coolant jacket 36, so that the pressurized coolant can circulate through the coolant jacket 36.

Also, in some embodiments, the inner wall 38 can include coolant apertures 42 so that the coolant jacket 36 can be in fluid communication with the machine cavity 22. In some embodiments, the coolant apertures 42 can be positioned substantially adjacent to the stator end turns 28. For example, in some embodiments, as the pressurized coolant circulates through the coolant jacket 36, at least a portion of the coolant can exit the coolant jacket 36 through the coolant apertures 42 and enter the machine cavity 22. Also, in some embodiments, the coolant can contact the stator end turns 28, which can lead to at least partial cooling. After exiting the coolant apertures 42, at least a portion of the coolant can flow through the machine cavity 22 and can contact various module 10 elements, which, in some embodiments, can lead to at least partial cooling of the module 10.

According to some embodiments of the invention, the coolant jacket 36 can include multiple configurations. In some embodiments, at least a portion of the coolant jacket 36 can extend through the sleeve member 14 a distance substantially similar to an axial length of the stator assembly 26. For example, in some embodiments, an axial length of a portion of the coolant jacket 36 can extend at least the same distance as the axial length of the stator assembly 26, including the stator end turns 28. In some embodiments, portions of the coolant jacket 36 can extend greater and lesser axial distances, as desired by manufacturers and/or end users for cooling.

In some embodiments, a portion of the coolant jacket 36 also can comprise at least one radially inward extension 44. For example, as shown in FIG. 2, in some embodiments, a region of the inner wall 38 can be substantially radially recessed so that the radially inward extension 44 of the coolant jacket 38 can be substantially adjacent to at least one of the stator end turns 28. In some embodiments, radially inward extensions 44 can be positioned adjacent to one of, both of, or neither of the stator end turns 28. Further, in some embodiments, the coolant jacket 36 can comprise radially inward extensions 44 substantially continuously around at least a portion of an outer diameter of at least one of the stator end turns 28 (i.e., one continuous radially inward extension around a portion of at least one of the stator end turns 28). In other embodiments, the coolant jacket 36 can comprise substantially discrete radially inward extensions 44 positioned around at least a portion of an outer diameter 27 of at least one set of the stator end turns 28. In some embodiments, the housing 12 can comprise at least two radially inward extensions 44. For example, in some embodiments, the housing 12 can comprise two halves coupled together in a substantially axially central location so that each half of the housing 12 can comprise a radially inward extension 44 and the electric machine 20 can be positioned substantially between the two halves.

In some embodiments, the stator end turns 28 can comprise a generally lesser outer diameter compared to the stator assembly 26, and, as a result, a greater distance can exist between the stator end turns 28 and the cooling jacket 36. In some embodiments, the radially inward extensions 44 of the coolant jacket 38 can enhance module 10 cooling because some of the coolant can circulate relatively closer to the stator end turns 28, compared to embodiments substantially lacking the radially inward extension 44. As a result, in some embodiments, a distance between the coolant and an area rejecting heat energy (i.e., the stator end turns) can be generally minimized, which can lead to generally increased heat energy transfer.

Figure 3:
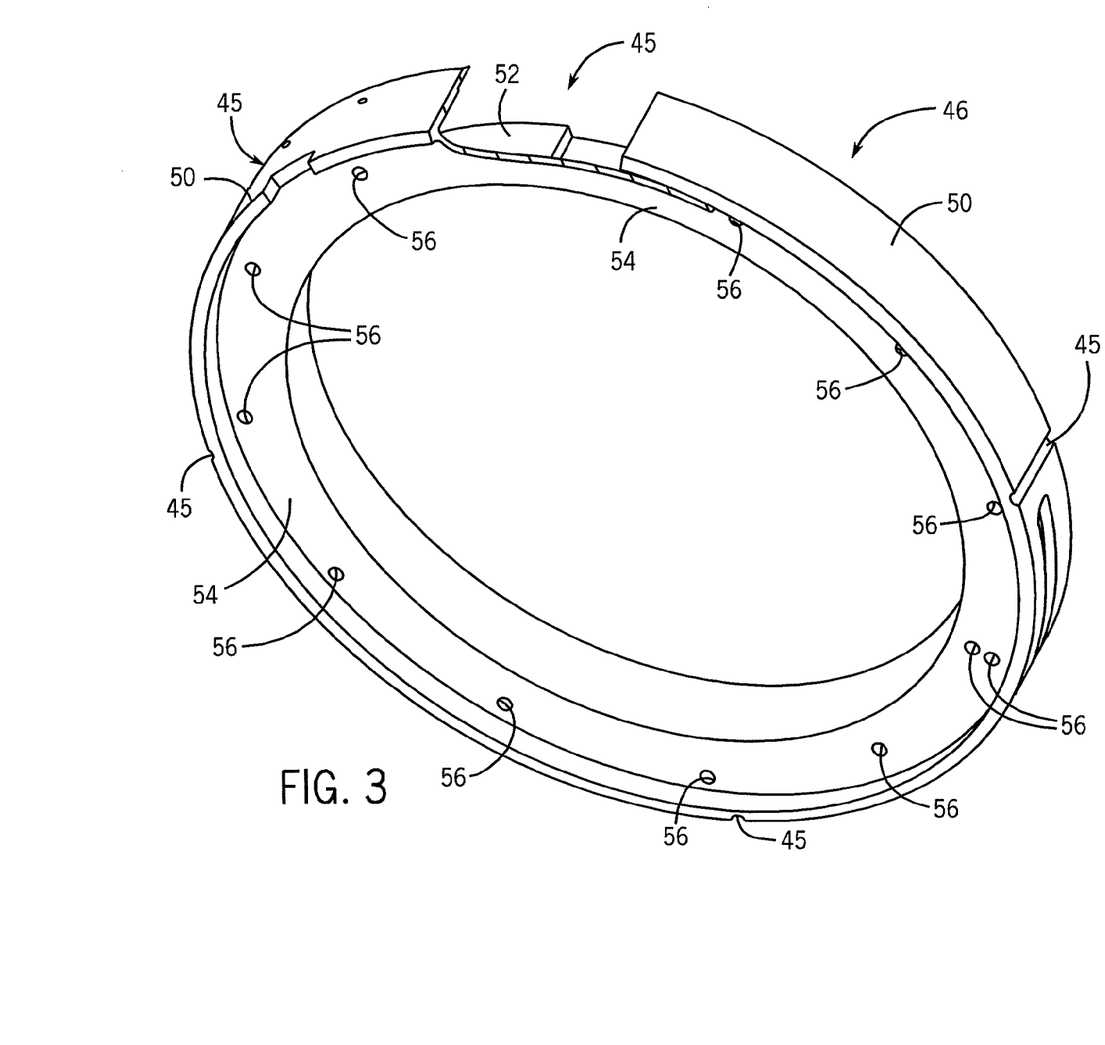
FIG. 3 is an isometric view of an end turn member according to one embodiment of the invention.

In some embodiments, an end turn member 46 can at least partially enhance module 10 operations. In some embodiments, the end turn member 46 can be substantially annular or ring shaped. In other embodiments, the end turn member 46 can comprise other shapes such as square, rectangular, regular and/or irregular polygonal, and other similar shapes. In some embodiments, the end turn member 46 can comprise a shape that is substantially similar to the general shape of the stator assembly 26, including the stator end turns 28. Moreover, in some embodiments, as shown in FIG. 3, the end turn member 46 can comprise a single structure, however, in other embodiments, the end turn member 46 can comprise multiple subunits coupled together. Further, in some embodiments, the end turn member 46 can comprise materials that can generally include favorable thermally conductive properties, such as, but not limited to aluminum or other metals and materials capable of generally withstanding operating temperatures of the electric machine. In some embodiments, the end turn member 46 can be fabricated using different methods including casting, molding, extruding, and other similar manufacturing methods.

In some embodiments, at least a portion of the inner wall 38 of the housing 12 can comprise the end turn member 46. In some embodiments, the end turn member 46 can be coupled the inner wall 38 of one of the end caps 16, 18 and/or the sleeve member 14. For example, in some embodiments, the end turn member 46 can be interference fit (e.g., press fit), welded, brazed, or otherwise coupled to the inner wall 38 using coupling methods such as, but not limited to conventional fasteners, adhesives, etc.

In some embodiments, the end turn member 46 can comprise at least one feature 45 configured and arranged to at least partially enhance the interaction of the end turn member 46 and the housing 12. For example, in some embodiments, as shown in FIG. 3, the features 45 can comprise apertures, recesses, grooves, flanges, extensions, and any other similar structures. In some embodiments, the features 45 can comprise a combination of configurations positioned around portions of a circumference of the end turn member 46. Moreover, in some embodiments, the features 45 can comprise multiple orientations such as radial, axial, circumferential, or any combination thereof. In some embodiments, regardless of the structure of the features 45, the inner wall 38 of the housing 12 can comprise corresponding features (not shown) configured and arranged to engage the features 45 (e.g., the features 45 can receive a portion of the features of the housing 12 and/or vice versa) of the end turn member 46 to aid in coupling together at least these two elements. Additionally, in some embodiments, the features 45 can substantially function as torque retention elements to help retain torque produced by the electric machine 20 during operations. Furthermore, the features 45 can also function as alignment elements to aid in guiding and/or aligning the end turn member 46 during coupling to the housing 12.

In some embodiments of the invention, the end turn member 46 can be substantially integral with the housing 12. In some embodiments, the housing 12 can be fabricated so that the end turn member 46 extends from the inner wall 38 of the housing 12. For example, in some embodiments, the end turn member 46 can be fabricated (e.g., casting, molding, extruding, etc.) as a portion of the housing 12 so that the elements are formed at substantially the same time and are substantially one element. As an additional example, in some embodiments, the end turn member 46 can be substantially integral with at least one of the end caps 16, 18 and/or the sleeve member 14 so that upon coupling together the end caps 16, 18 and the sleeve member 14, as previously mentioned, the end turn member 46 can be positioned substantially adjacent to the stator assembly 26. Although future references may suggest a non-integral end turn member 46, those references are in no way intended to excluded embodiments comprising a substantially integral end turn member 46 and elements of a substantially integral end turn member 46.

In some embodiments, the end turn member 46 can function to enhance cooling. For example, as previously mentioned, in some embodiments, the coolant jacket 36 can comprise at least one radially inward extension 44. However, installing the stator assembly 26 within the sleeve member 14 can be complicated because of the relative dimensions of the stator assembly 26 and the stator end turns 28. For example, in some embodiments, it can be difficult to position the stator assembly 26 with two radially inward extensions 44 over both axial sides of the stator assembly 26 because the outer diameter of the end turns 28 is less than that of the stator assembly 26. As a result, in some embodiments, the module 10 can comprise a radially inward extension 44 adjacent to one axial end of the stator assembly 26 and the end member 46 substantially adjacent to another axial end of the stator assembly 26. Accordingly, in some embodiments, the end turn member 46 can aid in cooling at least a portion of the stator assembly 26.

In some embodiments, the end turn member 46 can be configured and arranged to direct a portion of the coolant. In some embodiments, the end turn member 46 can comprise at least one first member aperture 48 that can be configured and arranged to substantially align with at least one of the coolant apertures 42 upon positioning of the end turn member 46 adjacent to the electric machine 20. Moreover, in some embodiments, the first member apertures 48 can comprise a substantially radial orientation. For example, in some embodiments, the end turn member 46 can comprise substantially the same number of first member apertures 48 as coolant apertures 42 so that when the end turn member 46 is positioned within the machine cavity 22, at least a portion of the coolant exiting the coolant apertures 42 can also flow through the first member apertures 48.

Figure 4:
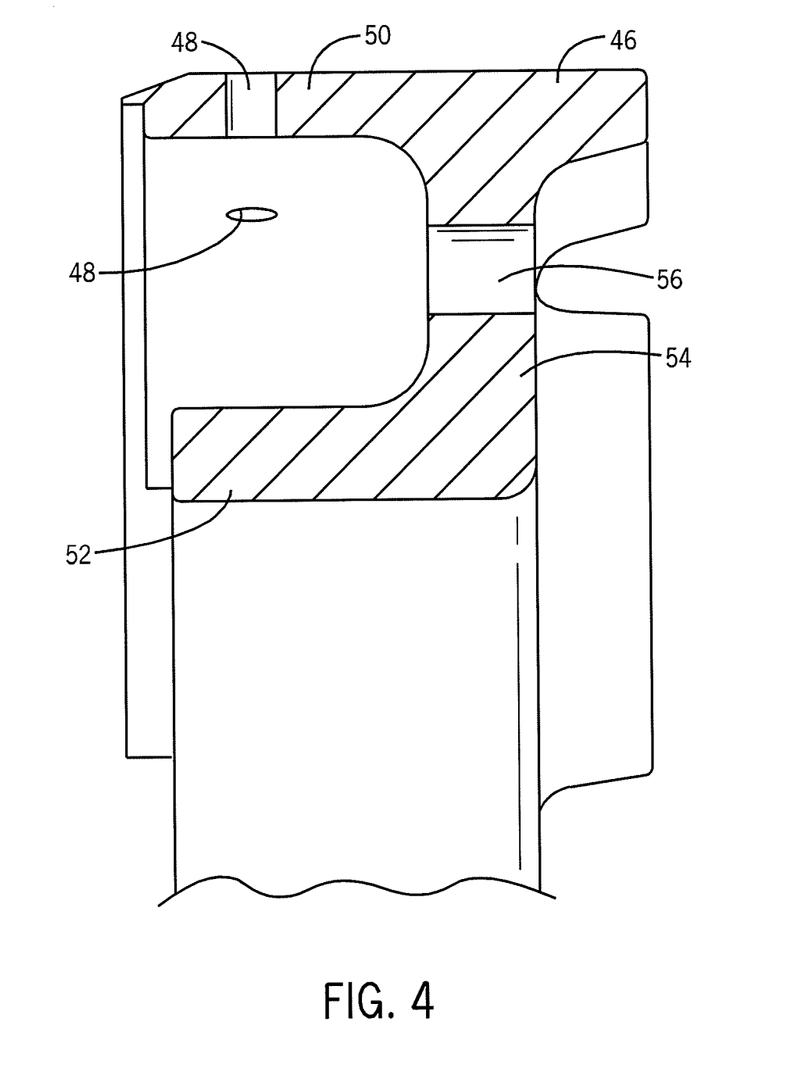
FIG. 4 is a partial cross-sectional view an end turn member according to one embodiment of the invention.
Figure 5:
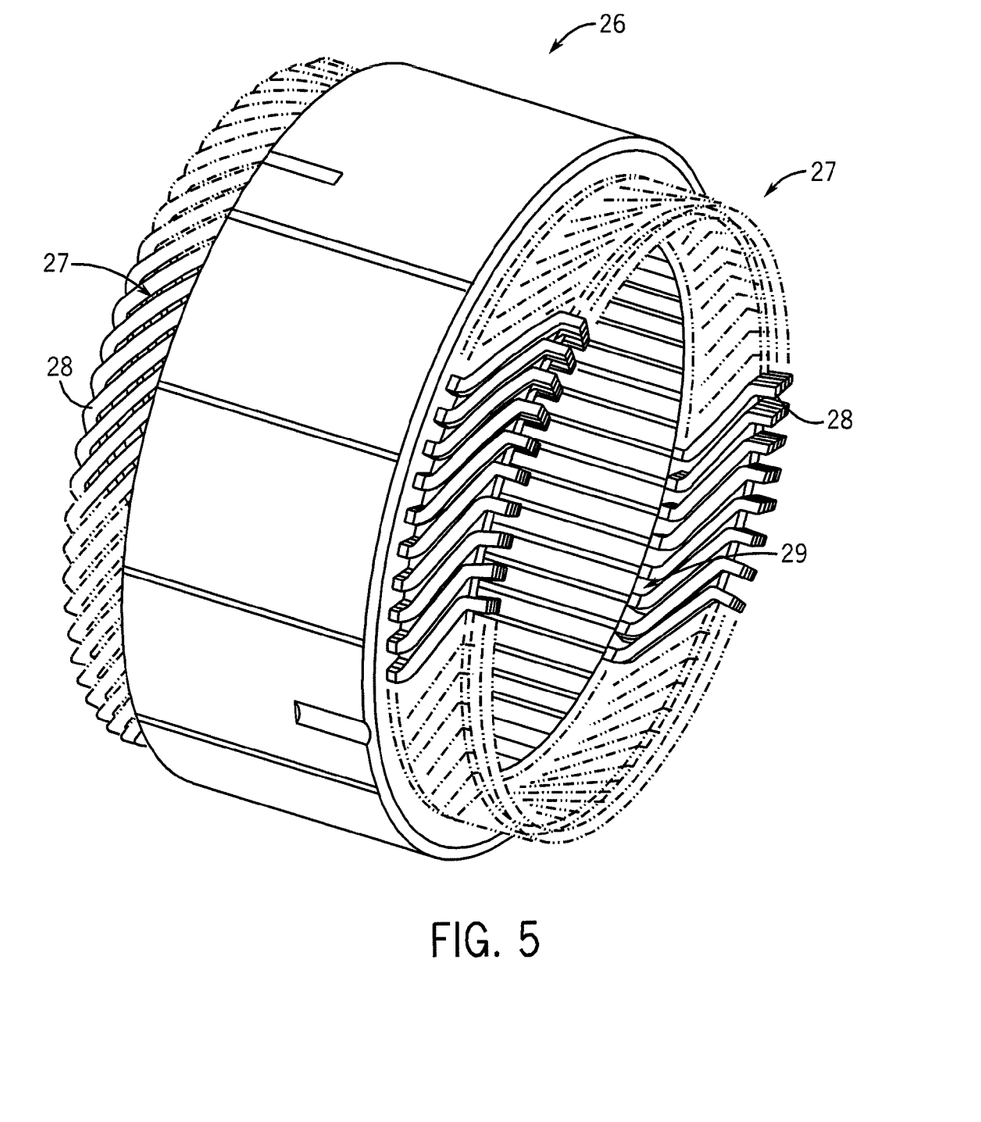
FIG. 5 is an isometric view of a stator assembly according to one embodiment of the invention.

In some embodiments, the end turn member 46 can comprise a radially outer flange 50, a radially inner flange 52, and a central region 54. As shown in FIGS. 2-4, in some embodiments, the end turn member 46 can be formed so that the flanges 50, 52 axially extend into the machine cavity 22 from the central region 54 (e.g., the end turn member 46 can comprise a sideways-oriented "u" shape). In some embodiments, the end turn member 46 can be formed (e.g., cast, molded, machined, etc.) so that the radially outer flange 50 and the radially inner flange 52 can axially extend from the central region 54 so that at least a portion of the stator end turns 28 can be received within the end turn member 46. For example, in some embodiments, when the end turn member 46 is positioned substantially adjacent to the stator assembly 26, the radially outer flange 50 can be substantially adjacent to the outer diameter 27 of the stator end turns 28. Moreover, in some embodiments, the stator end turns can comprise an inner diameter 29. In some embodiments, the radially inner flange 52 can be substantially adjacent to the inner diameter 29 of the stator end turns, as shown in FIGS. 2 and 5. Accordingly, in some embodiments, the central region 54 can be substantially adjacent to an axial outermost portion of at least a portion of the stator end turns 28.

As a result of the substantially adjacent spatial relationship of the end turn member 46 and the stator end turns 28, in some embodiments, the end turn member 46 can at least partially enhance heat energy transfer. In some embodiments, the end turn member 46 can comprise a substantially thermally conductive material (e.g., aluminum), as previously mentioned. As a result, because portions of the end turn member 46 can be substantially adjacent to portions of the end turns 28 and in thermal communication with at least a portion of the end turns 28, the end turn member 46 can receive at least a portion of the heat energy produced by the end turns 28 during electric machine 20 operations. Moreover, as previously mentioned, in some embodiments, the end turn member 46 can be immediately adjacent to the inner wall 38 of the housing 12 (e.g., friction fit, interference fit, substantially integral, etc.), which can lead to enhance heat energy transfer from the end turns 28 to the housing 12 via the end turn member 46 comprising thermally conductive materials.

Moreover, in some embodiments, the flanges 50, 52 can further aid in cooling. In some embodiments, the radially outer flange 50 can comprise the first member apertures 48 so that at least a portion of the coolant can flow through both the coolant apertures 42 and the first member apertures 48 and can contact the stator end turns 28. In some embodiments, before and/or after at least a portion of the coolant contacts the stator end turns 28, the end turn member 46 can enhance cooling by retaining at least a portion of the coolant adjacent to the end turns 28.

Moreover, in some embodiments, after entering the machine cavity 22, at least a portion of the coolant can flow toward a bottom of the module 10 via gravity. In some embodiments, the module 10 can comprise a conventional drain system (not shown) generally positioned at the bottom of the module 10 so that at least a portion of the coolant can flow from the machine cavity 22 into the drain system. In some embodiments, the drain system can fluidly connect the machine cavity 22 to a conventional heat exchange element (e.g., a radiator, a heat exchanger, etc.) that can be integral with, adjacent to, and/or remote from the module 10 (not shown). In some embodiments, at least a portion of the coolant can circulate through the heat exchange element where at least a portion of the heat energy can be removed and the coolant can be re-circulated for further cooling.

For example, in some embodiments, because the flanges 50, 52 and the central region 54 can be substantially adjacent to portions of the end turns 28, before and/or after the coolant contacts the end turns 28, the coolant can contact the end turn member 46. As a result, the coolant can at least partially accumulate immediately adjacent to the end turns 28 and/or bounce from the end turn member 46 to the end turns 28. In some embodiments, regardless of the mechanism, the end turn member 46 can at least partially enhance cooling because it can function to retain at least a portion of the coolant in close proximity to the stator end turns 28 so that more heat energy can be conducted to the coolant.

Furthermore, in some embodiments, the end turn member 46 can conduct at least a portion of the heat energy received from the stator end turns 28 to the housing 12. For example, because at least a portion of the coolant flows to the end turn member 46 after contacting the stator end turns 28 and receiving a portion of its heat energy, the coolant can conduct some of the heat energy to the end turn member 46. Moreover, in some embodiments, because the end turn member 46 can be integral with and/or coupled to the housing 12, the end turn member 46 can transfer at least a portion of the heat energy to the housing 12, which can transfer the heat energy to the surrounding environment via convection. Additionally, in some embodiments, the housing 12 and/or the end turn member 46 can conduct at least a portion of the heat energy into the coolant circulating through the coolant jacket 36.

Moreover, in some embodiments, the end turn member 46 can function to enhance operations of the module 10. In some embodiments, the end turn member 46 can comprise different geometries that could be relevant to module 10 operations and cooling. For example, in some embodiments, the end turn member 46 can comprise a variety of annuli, additional apertures, slots, other geometries, or combinations thereof to aid in operations. As a result, in some embodiments, some of these geometries can at least partially serve to enhance cooling by further enhancing coolant accumulation substantially adjacent to the end turns 28.

Additionally, in some embodiments, the end turn member 46 can ease manufacturing burdens. For example, in some embodiments, a module 10 may require some of the previously mentioned geometries and/or configurations for operations (e.g., extra space near the end turns 28 or other space concerns). In some embodiments, by integrating these features within the housing 12, extra costs can be incurred in order to change the housing 12 manufacturing process. By integrating some of these features within the end turn member 46, housing 12 manufacturing can remain substantially the same and the geometries can be substantially integrated with the end turn member 46. By way of example only, in some embodiments, in order to accommodate some special features of the electric machine 20 (e.g., special end turn portions, electrical connection points, etc.), the end turn member 46 can comprise at least some of the previously mentioned geometries to enable positioning of the electric machine 20 within the housing 12. Accordingly, costs and manufacturing complexity can be minimized because simple machining can be performed on the housing 12 and more complex machining can be performed of the end turn member 46.

According to some embodiments of the invention, the end turn member 46 can enhancing cooling in multiple module 10 configurations. For example, in some embodiments, the coolant jacket 36 can comprise a substantially sealed configuration. As a result, coolant can circulate through the jacket 36, but does not enter the machine cavity 22 via the apertures 44. Accordingly, coolant does not contact the stator end turns 28, which, in some embodiments, can impact module 10 cooling.

In some embodiments, the end turn member 46 can at least partially aid in cooling the stator end turns 28 where the coolant jacket 36 comprises a substantially sealed configuration. For example, in some embodiments, the end turn member 46 can comprise a substantially non-conductive material so that the flanges 50, 52 and the central region 54 can be substantially adjacent to portions of the end turns 28, as previously mentioned. As a result, in some embodiments, at least a portion of the heat energy produced by the stator end turns 28 can be transferred to the end turn member 46 via convection. Moreover, in some embodiments, because the end turn member 46 can be integral with and/or coupled to the housing 12, the end turn member 46 can transfer at least a portion of the heat energy to the housing 12, which can transfer the heat energy to the surrounding environment via convection or coolant circulating through the coolant jacket 36.

In some embodiments, the stator end turns 28 can comprise a substantially potted configuration. In some embodiments, at least a portion of the stator end turns 28 can coated, encased, or otherwise covered in a potting composition that can at least partially enhance thermal conductivity away from the end turns 28. In some embodiments, the potting composition can comprise a resin. For example, in some embodiments, the potting composition can comprise an epoxy resin, although, the potting composition can comprise other resins. In some embodiments, resins can provide a generally appropriate dielectric constant, thermal conductivity, thermal expansion, chemical resistance, etc. for use in applications involving module 10 operational temperatures and current flow. For example, in some embodiments, the potting composition can be converted to a substantially liquid state (e.g., via heating) and gravity fed over the end turns 28. In some embodiments, the end turns 28 can be placed in a mold prior to the gravity feed and/or injection so that the potting composition can cover at least a portion of the stator end turns 28 and can comprise a shape at least partially corresponding the shape of the mold. As a result, the potted stator end turns 28 can comprise a shape and/or configuration desired by the manufacturer and/or end user. In some embodiments, the potting composition can comprise a two-part mixture so that a first portion of the potting composition an a second portion of the potting composition can be mixed to activate the potting composition prior to application to the end turns 28.

In some embodiments, the end turn member 46 can aid in cooling the stator end turns 28 comprising a potted configuration. For example, in some embodiments, the potted end turns 28 can be configured and arranged so that, after solidifying, the potting composition can be immediately adjacent to and/or contact the flanges 50, 52 and the central region 54. As a result, in some embodiments, the potted stator end turns 28 can conduct at least a portion of the heat energy produced by the stator end turns 28 to the housing 12 via the end turn member 46. For example, as previously mentioned, in some embodiments, the potting composition can be generally thermally conductive so that at least a portion of the heat energy produced by the stator end turns 28 can be substantially conducted from the end turns 28 to the end turn member 46 via the potting composition.

In some embodiments, the end turn member 46 can be used in potting at least a portion of the stator end turns 28. In some embodiments, the end turn member 46 can function as the mold that can be used to form the potted stator end turns 28. For example, in some embodiments, the stator assembly 26 can be positioned with respect to the end turn member 46 so that at least a portion of the stator end turns 28 are positioned within the end turn member 46 (e.g., substantially adjacent to the flanges 50, 52 and the central region 54), as previously mentioned. In some embodiments, after positioning the end turn member 46 with respect to the stator end turns 28, the potting composition can be gravity fed or injected around and through at least a portion of the stator end turns 28 so that the stator end turns 28 can be substantially enclosed by the potting composition, as previously mentioned. As a result, in some embodiments, the end turn member 46 can be in contact with the stator end turns 28 via the potting composition so that heat energy can be readily conducted after the potting composition cures. The end turn member 46 can be used in the potting process before, during, and/or after assembly of the module 10.

In some embodiments, the end turn member 46 can comprise at least one second member aperture 56. In some embodiments, the end turn member 46 can comprise a plurality of second member apertures 56, as shown in FIG. 3. In some embodiments, the second member apertures 56 can be disposed in a generally axial direction through a portion of the central region 54, as illustrated in FIGS. 2-4. In some embodiments, the second member apertures 56 can be, at least partially, circumferentially arranged with respect to the end turn member 46. For example, in some embodiments, the second member apertures 56 can be arranged in regular circumferential patterns (e.g., an aperture 56 positioned every 30 degrees) or irregular circumferential patterns. Moreover, in some embodiments, the inner wall 38 of the housing 12 can comprise at least some second member apertures 56 so that at least some embodiments functioning without the end turn member 46 can operate as described below.

In some embodiments, at least a portion of the second member apertures 56 can function as expansion joints. In some embodiments comprising at least some potted stator end turns 28, the second member apertures 56 can function to account for potting composition expansion. For example, during operation of the electric machine 20, the production of heat energy by at least a portion of the stator end turns 28 can cause thermal expansion of the potting material. As a result of the thermal expansion of the potting composition, in some embodiments, a force and/or pressure can be applied to at least a portion of the stator end turns 28, the flanges 50, 52 and/or the central region 54, which can lead to damage to the end turn member 46 and/or the stator end turns 28.

In some embodiments, the second member apertures 56 can function to at least partially relieve the pressure associated with the thermal expansion of the potting composition. For example, in some embodiments, when the potting composition expands, at least a portion of the potting composition can expand into and/or through the second member aperture 56. As a result, in some embodiments, the force and/or pressure exerted upon at least some of the stator end turns 28 can be at least partially relieved by the second member apertures 56, which can at least partially reduce the risk of damage to the stator end turns 28 and/or end turn member 46 stemming from potting composition thermal expansion.

In some embodiments, the second member apertures 56 can be used in the potting process. In some embodiments, at least some of the second member apertures 56 can function as a potting composition inlet during the potting process. For example, in some embodiments, the potting composition can be gravity fed or injected around at least some portions of the stator end turns 28, as previously mentioned. In some embodiments, however, another volume of potting composition can be fed around portions of the stator end turns 28 via at least some of the second member apertures 56.

Moreover, in some embodiments, during the potting process, at least some of the second member apertures 56 can be substantially sealed (e.g. "capped-off") with a sealing structure (not shown) so that the potting composition does not flow through the second member apertures 56 during the potting process. Then, once the potting composition has substantially solidified (e.g., cured), the sealing structure can be removed and the second member apertures 56 can function as expansion joints during module 10 operations, as previously mentioned. Furthermore, in some embodiments, the end turn member 46 can substantially lack at least a portion of the second member apertures 56 prior to use in the potting process. After the end turns 28 are potted in the potting composition, at least a portion of the second member apertures 56 can be formed (e.g., machined, drilled, punched, stamped, etc.) for use as previously mentioned.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:
1. An electric machine module comprising:
a housing including an inner wall and an outer wall, the housing at least partially defining a machine cavity;
a coolant jacket positioned substantially between a portion of the inner wall and a portion of the outer wall;
at least one coolant aperture disposed through a portion of the inner wall, the at least one coolant aperture is configured and arranged to fluidly couple the coolant jacket and the machine cavity; and
an end turn member positioned within the machine cavity so that at least a portion of the end turn member contacts the inner wall, the end turn member including
a radially inward flange and a radially outward flange axially extending from a central region, and
at least one first member aperture disposed through a portion of the radially outward flange, and the end turn member positioned in the machine cavity so that the at least one first member aperture is immediately adjacent and substantially aligned to and in fluid communication with the at least one coolant aperture; and wherein a diameter of the at least one first member aperture is greater than a diameter of the at least one coolant aperture.

2. The electric machine module of claim 1, wherein the end turn member comprises cast metal.

3. The electric machine module of claim 1, and further comprising an electric machine at least partially enclosed within the housing, the electric machine including a stator assembly, the stator assembly comprising stator end turns and positioned so that the coolant jacket substantially circumscribes a portion of the stator assembly.

4. The electric machine module of claim 3, wherein the end turn member is positioned within the machine cavity so that the radially outward flange is substantially adjacent to an outer diameter of the stator end turns and the radially inward flange is substantially adjacent to an inner diameter of the stator end turns.

5. The electric machine module of claim 3, wherein an axial length of a portion of the coolant jacket is at least substantially equal to an axial length of the stator assembly.

6. The electric machine module of claim 3, wherein the coolant jacket comprises at least one radially inward extension adjacent at least one of the stator end turns.

7. The electric machine module of claim 3, wherein at least a portion of the stator end turns are potted in a potting composition.

8. The electric machine module of claim 1, wherein the end turn member comprises at least one feature selected from a list of an aperture, a recess, a groove, a flange, and an extension.

9. An electric machine module comprising:
a housing at least partially defining a machine cavity, the housing comprising an inner wall, an outer wall, and a coolant jacket positioned between a portion of the inner wall and a portion of the outer wall;
at least one coolant aperture disposed through a portion of the inner wall, the at least one coolant aperture configured and arranged to fluidly couple the coolant jacket and the machine cavity;
an electric machine positioned within the machine cavity and at least partially enclosed within the housing, the electric machine including a stator assembly circumscribing at least a portion of a rotor assembly, the stator assembly including stator end turns, and the stator end turns at least partially potted in a potting composition; and
an end turn member positioned within the machine cavity and in thermal communication with at least a portion of the stator end turns and a portion of the housing,
the end turn member including a radially inward flange and a radially outward flange axially extending from a central region,
the end turn member configured and arranged so that the radially outward flange is substantially adjacent to an outer diameter of the stator end turns and the radially inward flange is substantially adjacent to an inner diameter of the stator end turns;
at least one first member aperture disposed through a portion of the radially outward flange, the at least one first member aperture comprising a diameter greater than a diameter of the at least one coolant aperture; and
at least one second member aperture disposed through a portion of the central region.

10. The electric machine module of claim 9, wherein the electric machine is positioned with the housing so that the coolant jacket substantially circumscribes at least a portion of the stator assembly.

11. The electric machine module of claim 10, wherein the coolant jacket comprises at least one radially inward extension adjacent to at least some of the stator end turns.

12. The electric machine module of claim 9, wherein the at least one second member aperture are configured and arranged to receive a portion of the potting material during operation of the electric machine.

13. The electric machine module of claim 9, wherein the at least one second member aperture are circumferentially arranged around the end turn member.

14. The electric machine module of claim 9, wherein the end turn member is substantially integral with at least a portion of the housing.

15. A method of manufacturing an electric machine module, the method comprising:
providing a housing, the housing comprising a sleeve member and at least one end cap, the sleeve member including a coolant jacket;
providing an electric machine including a stator assembly, the stator assembly including stator end turns;
installing at least a portion of the electric machine within the housing so that the stator assembly is at least partially circumscribed by the coolant jacket;
the coolant jacket including at least one coolant aperture disposed through a portion of an inner wall of the housing,
the at least one coolant aperture configured to fluidly couple the coolant jacket and at least a portion of the stator assembly;
providing an end turn member including a radially outward flange, radially inward flange, and a central region;
providing at least one first member aperture disposed through a portion of the radially outward flange and substantially aligned to at least one coolant aperture, the at least one first member aperture comprising a diameter greater than a diameter of the at least one coolant aperture;
disposing at least one second member aperture through a portion of the central region;
positioning the end turn member within the housing so that the radially outward flange is substantially adjacent to an outer diameter of at least a portion of the stator end turns and the radially inward flange is substantially adjacent to an inner diameter of at least a portion of stator end turns.

16. The method of claim 15 and further comprising potting at least a portion of the stator end turns in a potting composition.

* * * * *